(12) United States Patent
Huang et al.

(10) Patent No.: US 12,352,890 B2
(45) Date of Patent: Jul. 8, 2025

(54) METHOD AND SYSTEM FOR LOW-PROBABILITY-OF-INTERCEPT RADAR SIGNAL WAVEFORM RECOGNITION

(71) Applicant: Intelligent Fusion Technology, Inc., Germantown, MD (US)

(72) Inventors: Hui Huang, Germantown, MD (US); Yi Li, Germantown, MD (US); Erik Blasch, Arlington, VA (US); Khanh Pham, Kirtland AFB, NM (US); Jiaoyue Liu, Germantown, MD (US); Nichole Sullivan, Germantown, MD (US); Dan Shen, Germantown, MD (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 1021 days.

(21) Appl. No.: 17/382,931

(22) Filed: Jul. 22, 2021

(65) Prior Publication Data
US 2024/0402298 A1     Dec. 5, 2024

Related U.S. Application Data

(60) Provisional application No. 63/055,110, filed on Jul. 22, 2020.

(51) Int. Cl.
| | |
|---|---|
| *G01S 7/41* | (2006.01) |
| *G01S 7/02* | (2006.01) |
| *G01S 7/40* | (2006.01) |

(52) U.S. Cl.
CPC ............ *G01S 7/417* (2013.01); *G01S 7/021* (2013.01); *G01S 7/4021* (2013.01)

(58) Field of Classification Search
CPC ........ G01S 7/417; G01S 7/021; G01S 7/4021
See application file for complete search history.

(56) References Cited

U.S. PATENT DOCUMENTS

| | | | |
|---|---|---|---|
| 11,718,255 B2 * | 8/2023 | Dias Da Cruz | G01S 13/56 701/49 |
| 11,867,833 B2 * | 1/2024 | Yeo | G01N 22/00 |
| 2015/0066486 A1 * | 3/2015 | Kokkinis | G10L 21/02 704/203 |
| 2020/0271756 A1 * | 8/2020 | Novoselsky | G01S 7/417 |
| 2020/0378812 A1 * | 12/2020 | Heim | G01F 15/024 |

* cited by examiner

*Primary Examiner* — Timothy X Pham
(74) *Attorney, Agent, or Firm* — ANOVA LAW GROUP, PLLC

(57) ABSTRACT

A method for recognizing a low-probability-of-interception (LPI) radar signal waveform includes: obtaining, by a radar signal receiver, an LPI radar signal s(t), s(t) varying with time t; extracting, by a radar signal processor, an adaptive feature and a pre-defined analytical feature from the LPI radar signal s(t); combining, by the radar signal processor, the adaptive feature with the pre-defined analytical feature to generate a constructed adaptive feature; and applying, by the radar signal processor, a convolutional neural network (CNN) model to classify the constructed adaptive feature to recognize the LPI radar signal waveform.

17 Claims, 15 Drawing Sheets

METHOD AND SYSTEM FOR LOW-PROBABILITY-OF-INTERCEPT RADAR SIGNAL WAVEFORM RECOGNITION

CROSS-REFERENCE TO RELATED APPLICATION

This application claims the priority of U.S. Provisional Application No. 63/055,110, filed on Jul. 22, 2020, the content of all of which is incorporated herein by reference in its entirety.

GOVERNMENT RIGHTS

The present disclosure was made with Government support under Contract No. N68335-20-C-0075, awarded by the United States Navy. The U.S. Government has certain rights in the present disclosure.

FIELD OF THE DISCLOSURE

The present disclosure generally relates to the field of radar system and, more particularly, relates to a method and a system for low-probability-of-intercept (LPI) radar signal waveform recognition.

BACKGROUND

Radar systems work by sending out a signal and then listening for its echo off distant objects. The radar signal being sent out is a radio signal and can be received with a radio receiver. The radio receiver is able to recognize a radar signal waveform to identify and locate the radar sending the radar signal. On one hand, ways of varying spectral distribution and other parameters of the radar signal during operation, such as a low-probability-of-intercept (LPI) radar signal waveform, are developed to conceal the identity and the location of the radar. On the other hand, accurately recognizing the LPI radar signal waveform is important in identifying and locating the radar.

BRIEF SUMMARY OF THE DISCLOSURE

One aspect or embodiment of the present disclosure includes a method for recognizing a low-probability-of-interception (LPI) radar signal waveform. The method includes: obtaining, by a radar signal receiver, an LPI radar signal s(t), s(t) varying with time t; extracting, by a radar signal processor, an adaptive feature and a pre-defined analytical feature from the LPI radar signal s(t); combining, by the radar signal processor, the adaptive feature with the pre-defined analytical feature to generate a constructed adaptive feature; and applying, by the radar signal processor, a convolutional neural network (CNN) model to classify the constructed adaptive feature to recognize the LPI radar signal waveform.

Another aspect or embodiment of the present disclosure includes a system for recognizing a low-probability-of-interception (LPI) radar signal waveform. The system includes a radar signal receiver for obtaining an LPI radar signal s(t), s(t) varying with time t; a memory storing computer program instructions; and a processor coupled to the memory and, when executing the computer program instructions, configured to perform: extracting an adaptive feature and a pre-defined analytical feature from the LPI radar signal s(t); combining the adaptive feature with the pre-defined analytical feature to generate a constructed adaptive feature; and applying a convolutional neural network (CNN) model to classify the constructed adaptive feature to recognize the LPI radar signal waveform.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
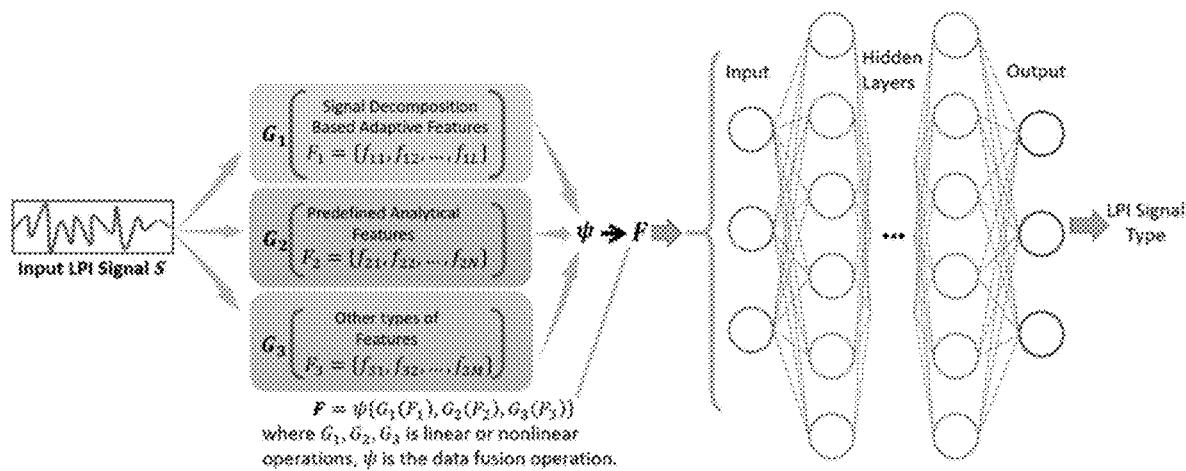
FIG. 1 depicts a system architecture for low-probability-of-interception (LPI) radar signal recognition according to various disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Low-probability-of-interception (LPI) radar signal is designed to have low probability of being detected and recognized by an intercept receiver via various waveform construction approaches. The waveform recognition of the LPI radar signal is one of the crucial functions for the intercept receiver in modern electronic warfare (EW) applications such as radar emitter recognition, cognitive radar and threat detection. With the development of artificial intelligence in recent years, numerous approaches for the LPI radar signal waveform recognition are based on various machine learning and signal analysis techniques. The signal analysis techniques are often used to extract features of the LPI radar signal and the machine learning techniques are further performed to achieve the LPI radar signal waveform recognition by classifying the LPI radar signal waveforms with the extracted features.

The signal analysis techniques used for feature extraction include time-frequency analysis (TFA), auto-correlation functions, high order spectral analysis, principle component analysis (PCA), and instantaneous frequency analysis. The TFA techniques include Wigner-Ville Distribution (WVD) method, Choi-William Distribution (CWD) method, and wavelet transform method. The TFA techniques are often coupled with a convolutional neural network (CNN) to achieve LPI radar signal waveform recognition. In addition to the CNN, other machine learning techniques, such as support vector machine, hierarchical decision tree, and recurrent neural network (RNN), can also be used to classify the extracted features.

The LPI radar signal often has a spread bandwidth and a relatively small peak power for staying silent from non-cooperative receivers. In addition, a low signal-to-noise ratio (SNR) of intercepted LPI radar signal makes it difficult for the LPI radar signal waveform recognition. The existing methods often suffer in a mediocre performance in low SNR environments. For example, the LPI radar signal waveform recognition performance severely degrades when the SNR of the LPI radar signal decreases below −4 dB. The existing methods, which often rely on well-defined analytical expressions developed under rigorous mathematical rules and mainly focus on discovering efficient distinctions for classification, are inadequate for revealing physical mechanisms hidden in the LPI radar signal and also introduce irrelevant interferences such as cross terms.

In order to tackle the challenge of the LPI radar signal waveform recognition in the low SNR environments, the present disclosure provides a method for recognizing the LPI radar signal waveform. The method uses an adaptive feature extracted from the LPI radar signal via an adaptive signal decomposition method. The adaptive feature includes main components extracted from the LPI radar signal. The adaptive signal decomposition method includes an empirical mode decomposition (EMD) method and a variational mode decomposition (VMD) method. Because the adaptive feature is derived from the LPI radar signal itself without irrelevant mathematical properties, signal features with new perspectives and hidden coherence in the LPI radar signal can be extracted. In addition, extraction of the adaptive feature involves with a process of discarding residuals of the LPI radar signal, which mitigates noise and further improves the recognition performance. Further, to incorporate more signal characteristics and formulate a comprehensive representation of the LPI radar signal for desired recognition performance, the present disclosure combines the adaptive feature with a pre-defined analytical feature to generate a constructed adaptive feature. The pre-defined analytical feature is derived based on the existing methods with the rigorous mathematical expressions. Then, the CNN model is applied to the constructed adaptive feature for classifying the LPI radar signal waveform.

In the embodiments of the present disclosure, the adaptive signal analysis methods are used to explore inherent features of the LPI radar signal for the waveform recognition. The adaptive feature extracted from the LPI radar signal is combined with the pre-defined analytical feature with adjustable parameters to form the constructed adaptive feature for the comprehensive representation of the LPI radar signal, resulting in robust classification performance for recognition of the LPI radar signal waveform. The LPI radar signal waveform recognition system includes an adaptive feature construction function and a CNN classification function. The testing results show that the disclosed system outperforms the benchmark system using the existing methods.

In order to verify the recognition performance of the system, the LPI radar signal is generated based on widely used modulation techniques including a noise contaminated linear frequency modulation (LFM) code or the so-called noise radar and five polyphase codes. The five polyphase codes include a Frank code, a P1 code, a P2 code, a P3 code, and a P4 code. The polyphase coded LPI radar signal is with high similarity and thus is difficult to be classified from each other. The polyphase coded LPI radar signal is generated with simulated channel configurations including random path fading effects and noise contaminations. The polyphase coded LPI radar signal is used to create a training dataset and a testing dataset for the LPI radar signal waveform recognition system. The generation methods of the polyphase coded LPI radar signal are described in detail below.

The noise contaminated LFM signal is generated by linearly modulating a frequency in a sweeping bandwidth of a continuous waveform, which can be represented by:

$$S(t) = Ae^{j\left(2\pi f_0 t + \frac{\pi B}{T}t^2\right)},$$

where S(t) is a LPI radar signal, A is an amplitude of the LPI radar signal S(t), $f_0$ is a starting frequency, B is a sweeping bandwidth, and T is a sweeping duration.

The polyphase coded LPI radar signal is generated by applying corresponding phase codes shown in Table 1 on the continuous waveform. The waveform with polyphase codes can be represented by:

$$S(t) = Ae^{j(2\pi f_c t + \phi_k)},$$

where A is the amplitude of the LPI radar signal S(t), $f_c$ is a carrier frequency, and $\phi_k$ is a phase modulation function.

TABLE 1

| Code | Phase |
|---|---|
| Frank | $\phi_{i,j} = \frac{2\pi}{M}(i-1)(j-1)$<br>where i, j = 1, 2, . . . , M. |
| P1 | $\phi_{i,j} = -\frac{\pi}{M}[M - (2j-1)][(j-1)M + (i-1)]$<br>where i, j = 1, 2, . . . , M. |
| P2 | $\phi_{i,j} = \left[\frac{\pi}{2}\left(\frac{M-1}{M}\right) - \frac{\pi}{M}(i-j)\right](M + 1 - 2j)$<br>where i, j = 1, 2, . . . , M. |
| P3 | $\phi_i = \left(\frac{\pi(i-1)^2}{N}\right)$<br>where i = 1, 2, . . . , N. |
| P4 | $\phi_i = \left(\frac{\pi(i-1)^2}{N}\right) - \pi(i-1)$<br>where i = 1, 2, . . . , N. |

The LPI radar signal waveform recognition system includes the adaptive feature construction function and the CNN classification function. FIG. 1 depicts a system architecture for low-probability-of-interception (LPI) radar signal recognition according to various disclosed embodiments of the present disclosure. As shown in FIG. 1, the LPI radar signal S is inputted into the system. The adaptive feature $F_1$ is extracted from the LPI radar signal S via a signal decomposition method, where $F_1=\{f_{11}, f_{12}, \ldots, f_{1L}\}$, and L is a number of the adaptive features. The signal decomposition method includes the EMD and the VMD. The pre-defined analytical feature $F_2$ is extracted from LPI radar signal S via a time-frequency analysis method, where $F_2=\{f_{21}, f_{22}, \ldots, f_{2N}\}$, and N is a number of the pre-defined analytical features. The time-frequency analysis method includes the WVD, the CWD, and the wavelet transform. The other feature $F_3$ is extracted from LPI radar signal S via another enhancement method, where $F_3=\{f_{31}, f_{32}, \ldots, f_{3M}\}$, and M is a number of the other features.

Each of the features $F_1$, $F_2$, $F_3$ is processed by the linear or non-linear $G_1$, $G_2$, $G_3$ operations, respectively. $G_1$, $G_2$, $G_3$ operations include one or more of reshaping, squaring, down-sampling, and maxpooling operations. The data fusion operation $\psi$ is performed on the processed features to generate the constructed adaptive feature F. Further, the constructed adaptive feature F is inputted into a CNN model. The CNN model classifies the constructed adaptive feature F to recognize the LPI radar signal waveform type. The CNN model includes an input layer, a plurality of hidden layers and an output layer.

The LPI radar signal may have dominant features in specific feature domain or several feature domains. To accommodate different types of the LPI radar signals, the features extracted from the LPI radar signal are constructed with the adjustable parameters to form the constructed adaptive feature. The adaptive feature construction operations include the linear and non-linear operations. The selection of these adjustable operations is an art and can be performed empirically based on the signal features. For example, a signal with stronger frequency band features can be applied by a feature enhancing operation such as the squaring function for the feature elements extracted from VMD. The adaptive feature construction formulates a spread adaptive feature which includes the nature of the signal characteristics as well as standard pre-defined analytical parameters and thus provides a comprehensive representation of the signal characteristics for better performance in the LPI radar signal waveform recognition.

Although the disclosed signal waveform recognition method performs well for the LPI radar signal, the same method may also be adapted to other signals.

As a part of the method for recognizing the LPI radar signal waveform, the adaptive feature extraction method is described in more detail below. In some embodiments, the feature extraction method includes the EMD method and the VMD method. The EMD method is an adaptive signal decomposition method that is based on the local characteristics of the signal itself. A complicated signal can be decomposed into a finite and often small number of intrinsic mode functions (IMFs). The IMFs are considered as the components of the original signal and satisfy the following conditions. In the original signal, a number of extrema and a number of zero crossing must either equal or differ at most by one. At any data sample point, a mean value of an envelop defined using the local maxima and an envelop defined using the local minima is zero. The EMD works in temporal space where a posterior defined basis is derived from the original signal under the assumption that the signal may have many coexisting simple oscillatory modes of significantly different frequencies at any given time. With the above definition and assumption, any signals can be decomposed through a sifting process as described below.

In some embodiments, the signal s(t) is decomposed into IMFs according to the following process. The process includes: identifying all extrema of s(t); interpolating all local maxima to form an upper envelop u(t); interpolating all local minima to form a lower envelop l(t); calculating a mean envelop m(t), where m(t)=(u(t)+l(t))/2; extracting the mean envelop m(t) from s(t) to obtain h(t), wherein h(t)=s(t)−m(t); determining whether h(t) is an IMF; and in response to h(t) being an IMF and a number of obtained IMFs being less than a pre-configured number, iterating all above steps on a residue signal r(t), where r(t)=s(t)−h(t), otherwise iterating all above steps on h(t).

Similar to EMD method, the VMD method adaptively decomposes an arbitrary signal into a number of principle modes or IMFs. Unlike the EMD method which is limited by its algorithmic ad-hoc nature lacking mathematical theory and thus reducing the algorithm's robustness of the decomposition, the VMD method is theoretically well-founded in a frequency domain to extract frequency band components of the input signal. The VMD method addresses the constrained variational problem by solving:

$$\min_{u_k, \omega_k} \left\{ \int \sum_k \left| \partial_t \left[ \left( \delta(t) + \frac{j}{\pi t} \right) * u_k(t) \right] e^{-j\omega_k t} \right|^2 dt \right\}$$

$$\text{s.t.} \sum_k u_k = s(t),$$

where $u_k(t)$ is a decomposed IMF of s(t) with its center frequency $\omega_k$, $\delta(t)$ is a Dirac delta function, $1/\pi t$ is an impulse response of Hilbert transform, $$\left( \delta(t) + \frac{j}{\pi t} \right) * u_k(t)$$

is an analytic signal, a real part of the analytic signal is s(t), an imaginary part of the analytic signal is a Hilbert transform of s(t).

Figure 2:
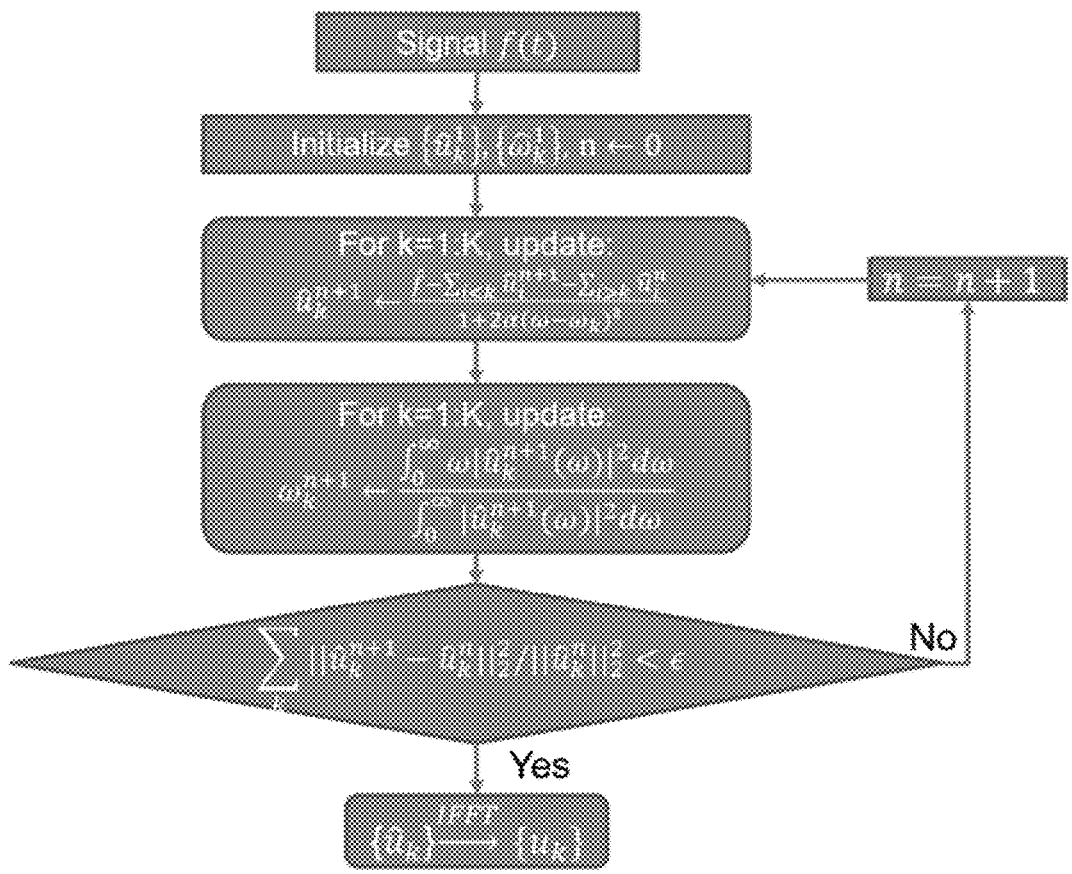
FIG. 2 depicts a flow chart illustrating an exemplary variational mode decomposition (VMD) method for extracting an adaptive feature from the LPI radar signal according to various disclosed embodiments of the present disclosure.

In some embodiments, the VMD method is performed as shown in FIG. 2 in the frequency domain and leads to the decomposition of the input signal. The IMFs from the decomposition process are considered as VMD features.

Figure 3A:
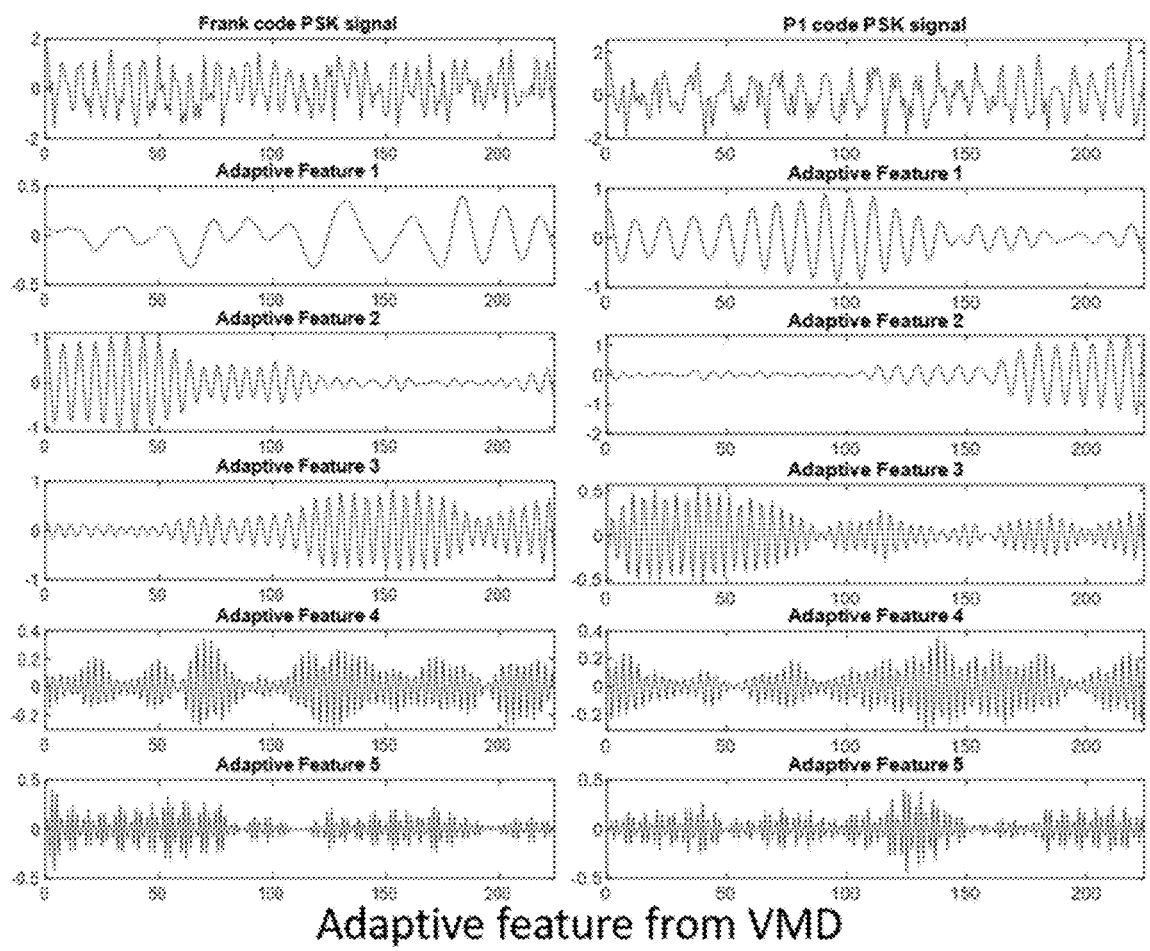
FIG. 3A depicts a schematic diagram illustrating exemplary adaptive features extracted by the VMD method according to various disclosed embodiments of the present disclosure.
Figure 3B:
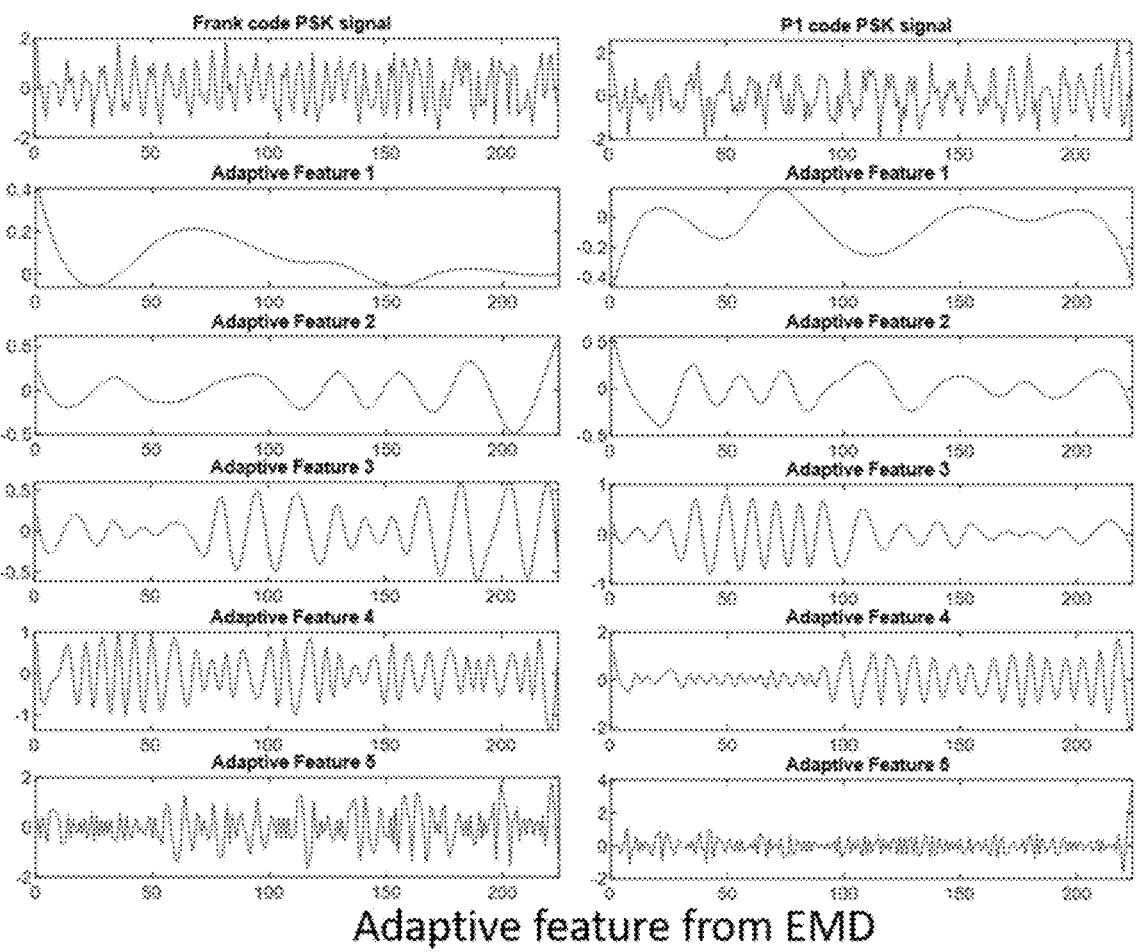
FIG. 3B depicts a schematic diagram illustrating exemplary adaptive features extracted by the EMD method according to various disclosed embodiments of the present disclosure.
Figure 4A:
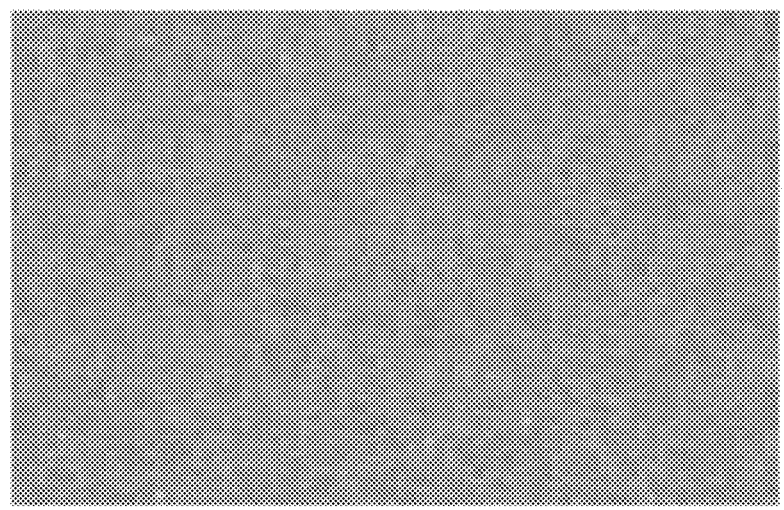
FIG. 4A depicts a schematic diagram illustrating VMD and EMD feature from a Frank code PSK signal according to various disclosed embodiments of the present disclosure.

FIG. 3 displays five extracted adaptive features as examples using EMD and VMD from a Frank code PSK signal. In some embodiments, EMD and VMD features are combined into one matrix as the adaptive feature shown in FIG. 4A.

Figure 4B:
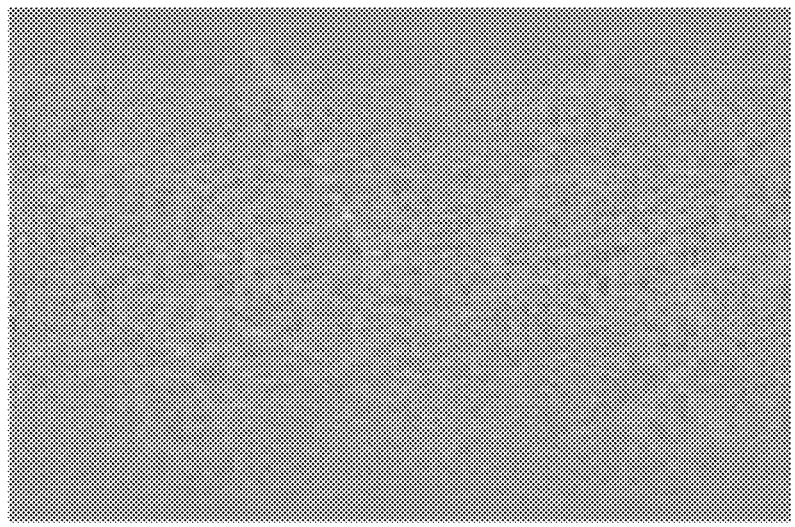
FIG. 4B depicts a schematic diagram illustrating WVD feature from a Frank code PSK signal according to various disclosed embodiments of the present disclosure.

In some embodiments, the pre-defined analytical feature extraction method includes the WVD method, the CMD method, and the wavelet method. The WVD is widely used in the analysis of non-stationary signals such as the LPI radar signal, which exhibits the highest signal energy concentration in the time-frequency plane for modulated signals. This characteristic of the WVD makes it a promising feature of detecting and classifying different non-periodic signals. The WVD feature is calculated by:

$$W(t, \omega) = \frac{1}{2\pi} \int S\left(t + \frac{\tau}{2}\right) S^*\left(t - \frac{\tau}{2}\right) e^{-j\omega t} d\tau,$$

where S is the LPI radar signal, S* represents complex conjugate of the LPI radar signal, τ is a time lag, and ω is a frequency. For example, FIG. 4B shows the WVD of the Frank code PSK signal with a carrier frequency of 1 kHz and SNR of 5 dB.

Figure 4C:
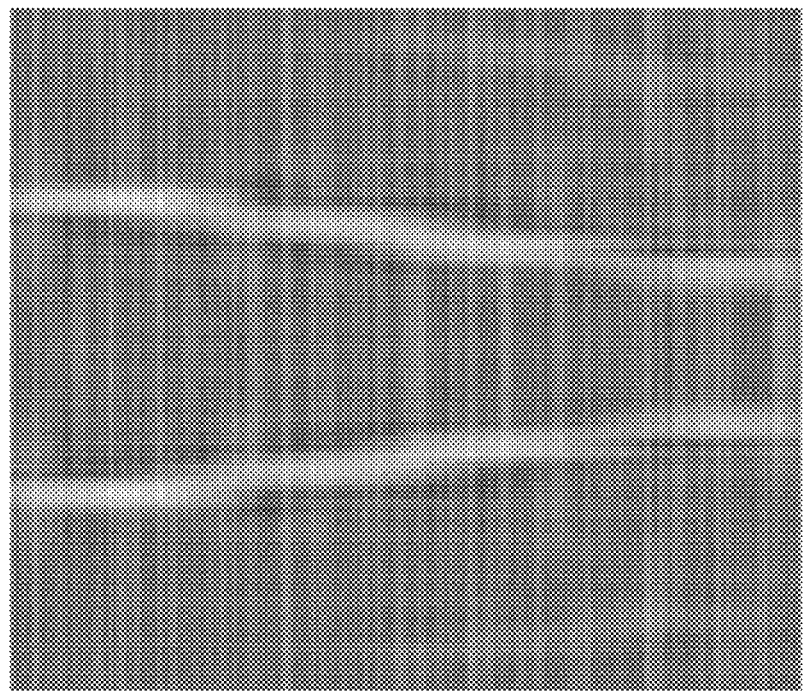
FIG. 4C depicts a schematic diagram illustrating CWD feature from a Frank code PSK signal according to various disclosed embodiments of the present disclosure.

The CWD method uses an exponential kernel in the time-frequency distribution representation to minimize cross-term components that are present in the WVD. The attenuation of the cross-term components in the time-frequency plane allows the modulation type to be more readily determined. The CWD feature is calculated by:

$$C_s(t, \omega, \phi) = \frac{1}{2\pi} \int \int \int e^{j(\xi\mu - \tau\omega - \xi t)} \phi(\xi, \tau) A(\mu, \tau) d\mu d\tau d\xi,$$

where $\phi(\xi, \tau)$ is a kernel function, $\phi(\xi, \tau) = e^{-\xi^2 \tau^2/\sigma}$, σ is a scaling factor, σ>1, $$A(\mu, \tau) = x\left(\mu + \frac{\tau}{2}\right) x^*\left(\mu - \frac{\tau}{2}\right),$$

x(μ) is a time signal and x*(μ) is its complex conjugate, μ and τ are axes in an ambiguity domain, τ is a time lag, and ω is a frequency. For example, as shown in FIG. 4C, the CWD of the Frank code PSK signal is obtained according to the above equations.

The wavelet transform method is often used for signal classification. The LPI signal often contains numerous non-stationary characteristics. The wavelet transform method is efficient in representing and analyzing the non-stationary characteristics. As such, the wavelet transform feature may be useful in recognizing the LPI radar signal waveform. When extracting the wavelet transform feature, the joint time-frequency representation can be obtained. The extracted wavelet transform feature is inputted into the classifier.

Figure 4D:
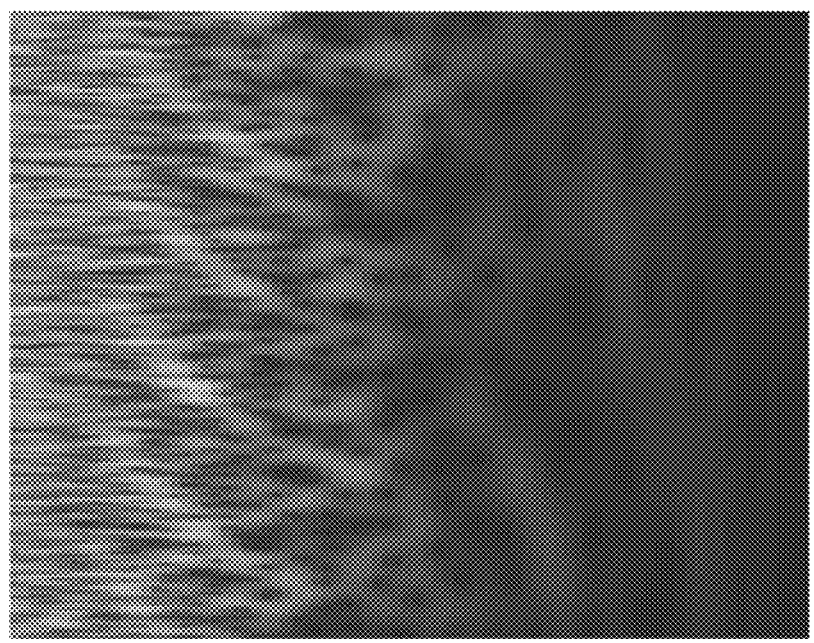
FIG. 4D depicts a schematic diagram illustrating wavelet transform feature from a Frank code PSK signal according to various disclosed embodiments of the present disclosure.

In some embodiments, the wavelet feature is a Morse wavelet feature and is calculated by:

$$W(j, k) = \sum_j \sum_k s(k) \psi_{jk}(n), \text{ and}$$

$$\psi_{jk}(n) = 2^{\frac{-j}{2}} \psi(2^{-j} n - k),$$

where S(k) is the LPI radar signal, W(j, k) are wavelet transform coefficients, $\psi_{jk}(n)$ is a mother wavelet, j is a scale parameter, and k is a shift parameter. For example, FIG. 4D shows the wavelet feature of the Frank code PSK signal.

Figure 5:
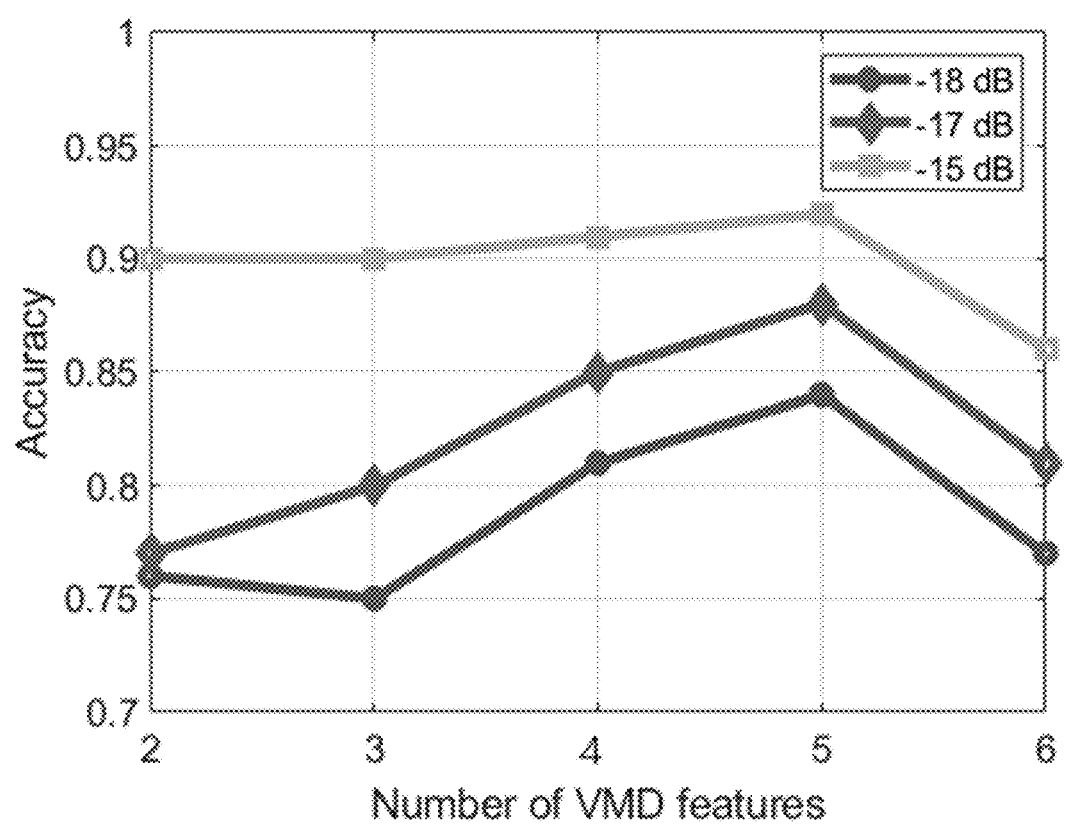
FIG. 5 depicts a schematic diagram illustrating a relationship between a number of VMD features and a classification accuracy according to various disclosed embodiments of the present disclosure.

Each of the WVD feature, the CMD feature, and the wavelet feature is evaluated to obtain a performance contribution of the features going beyond the fusion operation. A simple three-layered CNN mode is used in the feature evaluation process. The number of adaptive features from the EMD and the VMD is determined. Because different numbers of IMFs contain different amounts of characteristics from the original signal, the number of IMFs contained in the adaptive features may affect the classification performance to some extent. Take the VMD feature as an example. When the SNR level includes −15 dB, −17 dB, and −18 dB, the number of the VMD feature may have substantial impact on the classification performance. The number of the VMD features are set to be from 2 to 6. The VMD features are inputted into the CNN model. FIG. 5 shows the results of different number of the VMD features. The result shows that 5 number of the VMD features outperforms other number of the VMD features for the selected three SNR levels. In some embodiments, 5 number of the VMD features are selected.

Figure 6:
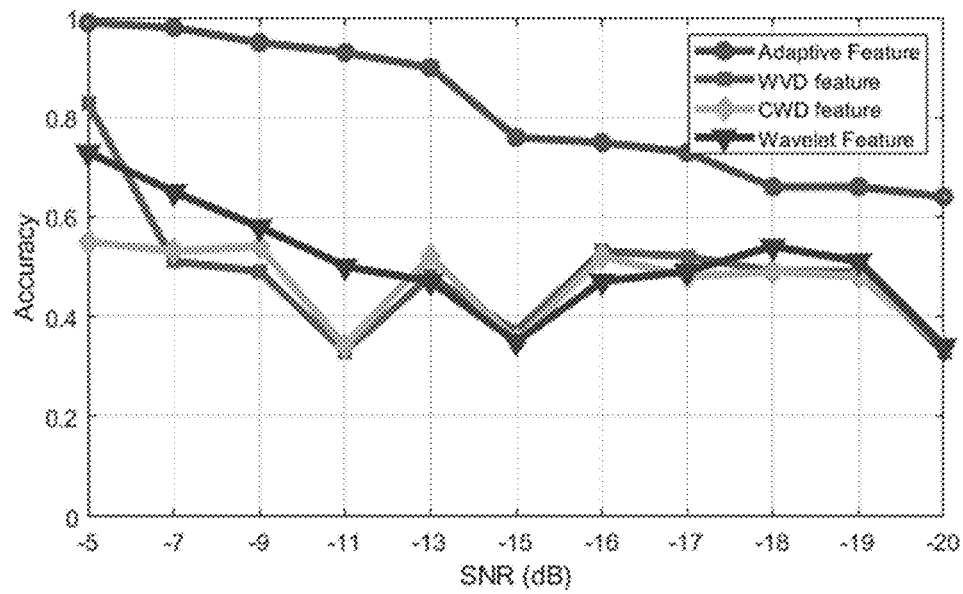
FIG. 6 depicts a schematic diagram illustrating classification performance of different features according to various disclosed embodiments of the present disclosure.

Further, the classification performance of each type of the features is evaluated and compared by putting the individual type of feature into the CNN model. FIG. 6 shows the results of the classification performance of different features. As shown in FIG. 6, the adaptive feature has the best performance among all the features, indicating that the adaptive feature is the dominant component. The other features, such as the WVD feature, the CWD feature, and the wavelet feature are considered as complementary features in representing the original signal.

After the adaptive feature and the analytical feature are extracted, the adaptive feature and the analytical feature are combined or fused to form the constructed adaptive feature. Although the adaptive feature is the main consideration of the LPI radar signal waveform recognition, the LPI radar signal may have dominant features in specific feature domain or several feature domains. When the adaptive feature and the analytical feature are combined, they will be combined with different weights corresponding to different contribution levels. In some embodiments, the adaptive feature and the analytical feature are simply combined without different weights. In some other embodiments, the adaptive feature and the analytical feature are subject to an adjustable adaptive feature construction operation before being combined. The adjustable adaptive feature construction operation includes the linear and non-linear operations for a feature fusion process.

The adjustable adaptive feature construction operation is performed based on the results collected from the feature evaluation of the individual feature. For example, the adaptive features extracted from the VMD and the EMD may remain at an original data size without data sample loss or may be performed with a squaring function while the analytical features may be down-sampled via maxpooling with data sample loss. The present disclosure does not limit the type of operations used in combining the features. It is difficult to predict the performance improvement for various operations for the CNN model. The embodiments of the present disclosure formulate a spread adaptive feature construction process that includes the nature of the original signal captured in the adaptive feature and additional rigorous mathematical parameters captured in the analytical feature. Thus, the LPI radar signal with different dominant characteristics may be comprehensively represented.

In some embodiments, combining the adaptive feature with the pre-defined analytical feature to generate the constructed adaptive feature includes:

$$F = \psi\{G_1(F_{AD}), G_2(F_{WVD}), G_3(F_{CWD}), G_4(F_{WL})\},$$

where F is the constructed adaptive feature, $F_{AD}$ is the adaptive feature, $F_{WVD}$ is the WVD feature, $F_{CWD}$ is the CWD feature, $F_{WL}$ is the wavelet feature, $G_1$, $G_2$, $G_3$, $G_4$ are linear or non-linear operations, and $\psi$ is a data fusion operation.

In order to combine the features and further input the features into the CNN model for classification, formats and sizes of the features may have to be unified. Operations including reshaping, squaring, down-sampling, and maxpooling are performed on the features before the features are combined and inputted into the classifier. The operations are adjustable, and the types of the operations are not limited by the present disclosure. Each of the above operations is described in detail below.

The reshaping operation is often used for manipulating a shape of the feature. For example, when the adaptive features from the VMD and the EMD are 10 vectors with the shape of 1 by 4,096, the adaptive features may be reshaped to a matrix with the shape of 512 by 80.

The squaring operation is often used to enhance the feature in a process of feature fusion. The squaring operation is performed simply by squaring the absolute value of the data samples.

The down-sampling operation is often used for the feature that do not show excellent classification performance. For example, the CWD feature with the shape of 2,048 by 2,048 may be down-sampled to 512 by 80, such that it is unified with the exemplary adaptive features above.

The maxpooling operation is a special down-sampling operation, which uses a maximum value of each sub-region of the original data samples as the down-sample value. The maxpooling operation is performed in part to assist overfitting by providing an abstracted form of the original representation such as the WVD feature. In addition, the maxpooling operation reduces the computational cost by reducing the number of parameters to learn in the CNN model.

Figure 7:
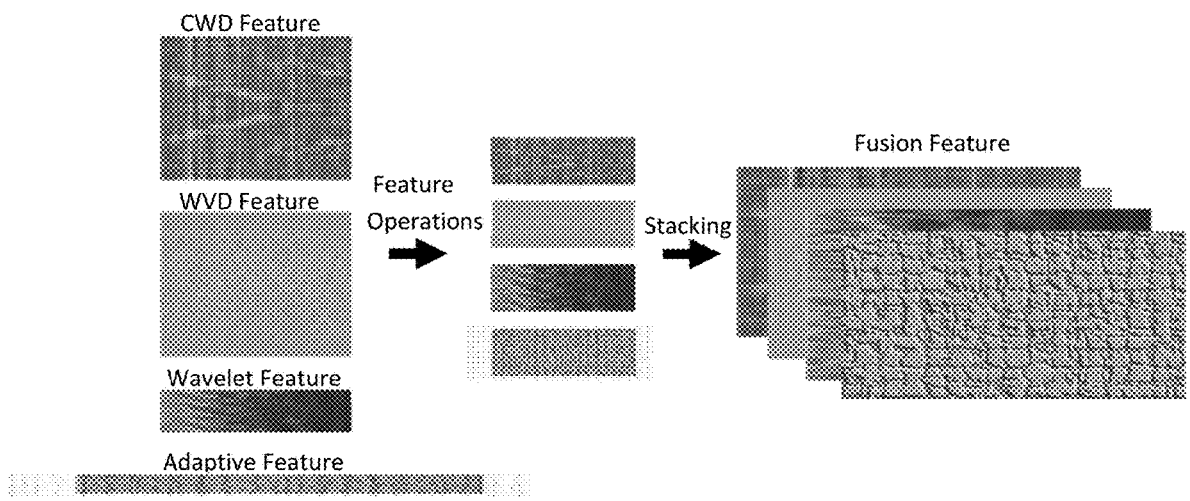
FIG. 7 depicts a schematic diagram of an exemplary feature fusion process for different features according to various disclosed embodiments of the present disclosure.

In some embodiments, the four types of the features are combined by simply stacking the matrices of the features before being inputted into the CNN model. FIG. 7 shows an exemplary feature fusion process with the four types of the features as images.

Figure 8:
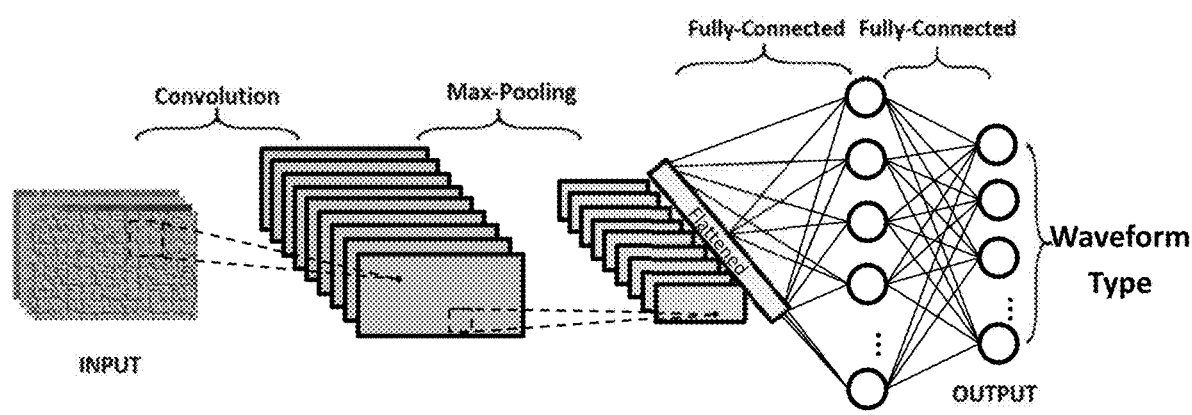
FIG. 8 depicts a schematic diagram illustrating an exemplary CNN model for classifying the LPI signal waveform according to various disclosed embodiments of the present disclosure.

After the constructed adaptive feature is obtained through the data fusion operation, the constructed adaptive feature is inputted into the CNN based classifier. The CNN model exhibits excellent performance in classifying images, making it suitable for classifying and recognizing the LPI radar signal waveform. FIG. 8 depicts a schematic diagram illustrating an exemplary CNN model for classifying the LPI signal waveform according to various disclosed embodiments of the present disclosure. The CNN based classifier performs a series of operations on the constructed adaptive feature. As shown in FIG. 8, the constructed adapter feature is inputted into an input layer. The inputted data is processed by a plurality of convolutional layers and then is processed by a rectified linear unit. The rectified data is pooled at the maxpooling layer. The pooled data is processed at a fully connected layer. The processed data is outputted at an output layer. Hyperparameters of the CNN model are designed based on a basic CNN structure including a convolution filter size, a number of convolution layers and fully connected layers, and a number of neurons in each layer. In addition, the regularization techniques such as dropout layers are also used for determining the optimal structure for the LPI radar signal recognition based on numerous Monte Carlo simulations.

Figure 9A:
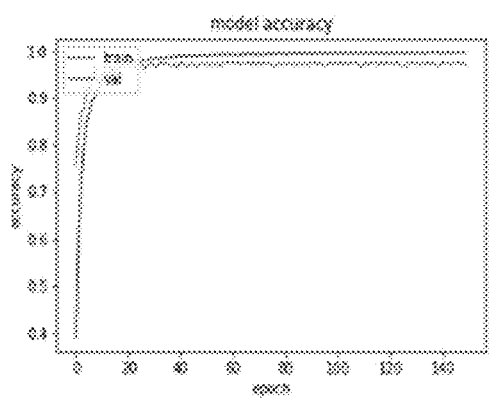
FIG. 9A depicts a schematic diagram illustrating accuracy of training and validation in the CNN model having three convolution layers according to various disclosed embodiments of the present disclosure.
Figure 9B:
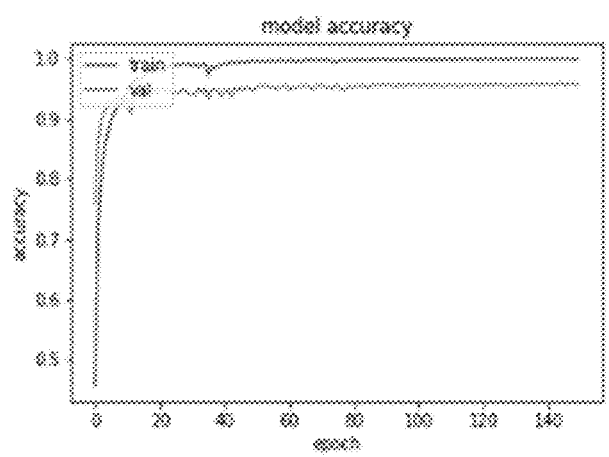
FIG. 9B depicts a schematic diagram illustrating accuracy of training and validation in the CNN model having five convolution layers according to various disclosed embodiments of the present disclosure.
Figure 9C:
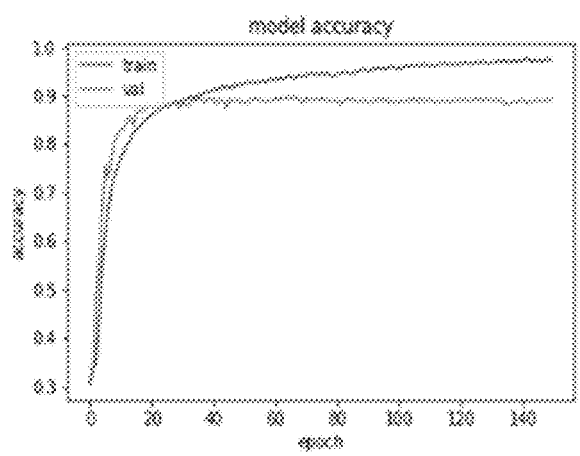
FIG. 9C depicts a schematic diagram illustrating accuracy of training and validation in the CNN model having seven convolution layers according to various disclosed embodiments of the present disclosure.

In some embodiments, the number of convolution layers and the number of fully connected layers are determined through various simulations. Three CNN structures are simulated as shown in Table 2 to test and compare the performance with the same dataset. In the training process, a training accuracy and a validation accuracy are plotted in FIG. 9 to show how different CNN models fit the dataset. As shown in FIG. 9, the training accuracy and the validation accuracy of the CNN model having three convolution layers or the 3-layer CNN model are the most similar compared with the other two CNN models. In other words, the CNN model having the three convolution layers fits better than the other two more complicated CNN models.

TABLE 2

| Index | Structure | Network Depth |
|---|---|---|
| 1 | 1CNN + 2DNN | 3 layers |
| 2 | 3CNN + 2DNN | 5 layers |
| 3 | 5CNN + 2DNN | 7 layers |

Figure 10A:
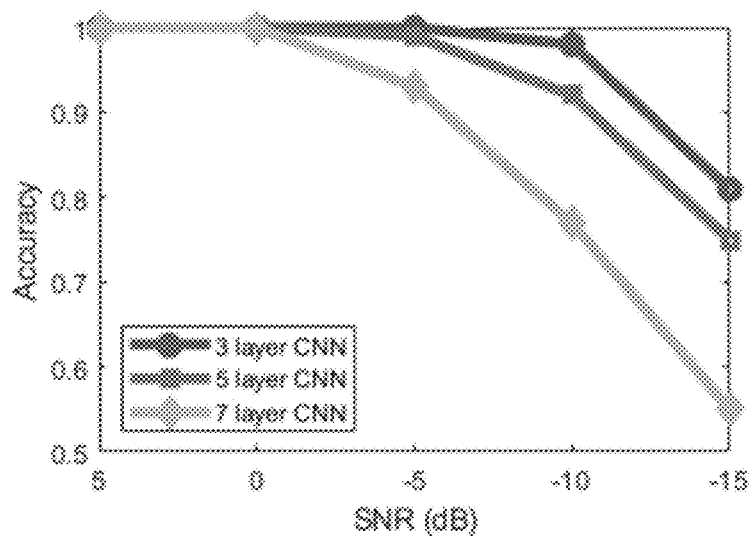
FIG. 10A depicts a schematic diagram illustrating classification accuracy of the three CNN models with a dataset according to various disclosed embodiments of the present disclosure.
Figure 10B:
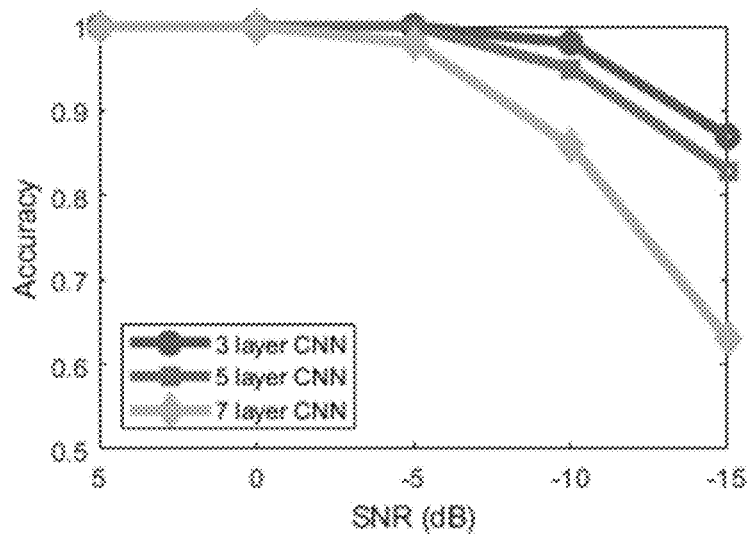
FIG. 10B depicts a schematic diagram illustrating classification accuracy of the three CNN models with a double-sized dataset according to various disclosed embodiments of the present disclosure.

In order to exclude an effect of small datasets, a double-sized dataset is tested to evaluate the classification performance. The classification performances of the three CNN models are compared by testing signals with the SNR levels of 5 dB, 0 dB, −5 dB, −10 dB, and −15 dB. FIG. 10 depicts a schematic diagram illustrating classification accuracy of the three CNN models with a dataset and a double-sized dataset according to various disclosed embodiments of the present disclosure. The classification accuracy does not increase substantially for the 3-layer CNN model between two datasets. The 5-layer CNN model and the 7-layer CNN model perform similar to the 3-layer CNN model, indicating the 3-layer CNN model outperforms the 5-layer CNN model and the 7-layer CNN model. In some embodiments, the 3-layer CNN model is used in classifying the constructed adaptive feature. The other hyperparameters are determined based on a similar manual and grid search method.

Figure 11:
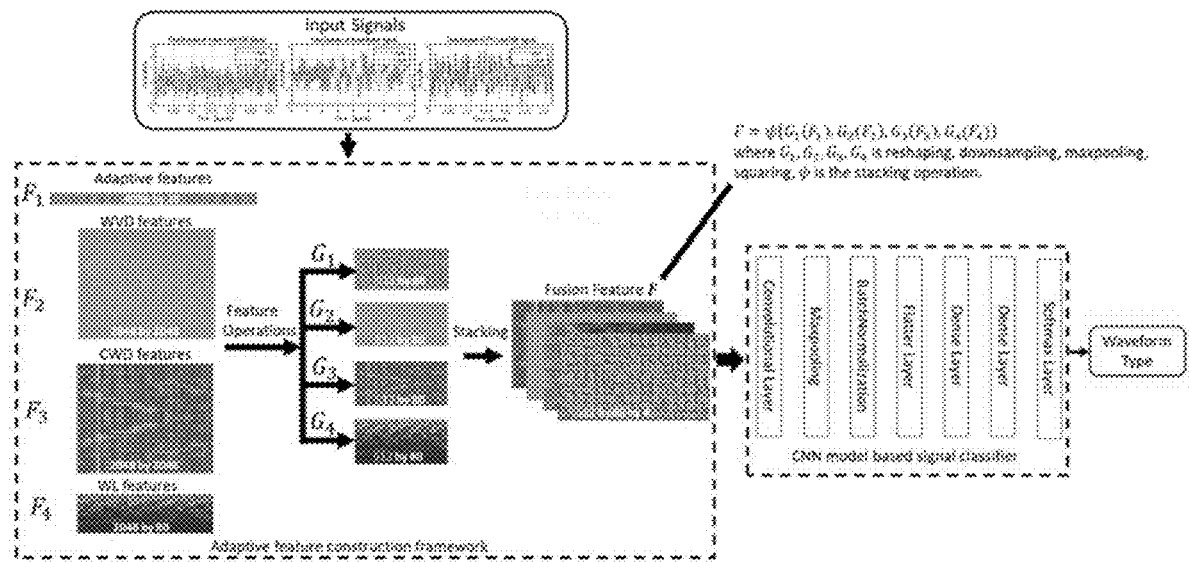
FIG. 11 depicts a block diagram illustrating an exemplary LPI radar signal recognition system according to various disclosed embodiments of the present disclosure.

FIG. 11 depicts a block diagram illustrating an exemplary LPI radar signal recognition system according to various disclosed embodiments of the present disclosure. As shown in FIG. 11, the adaptive feature $F_1$ is a 4,096 by 10 matrix, the WVD feature $F_2$ is a 2,048 by 2,048 matrix, the CWD feature $F_3$ is a 2,048 by 2,048 matrix, and the wavelet feature $F_4$ is a 2,048 by 80 matrix. The adaptive feature $F_1$, the WVD feature $F_2$, the CWD feature $F_3$, and the wavelet feature $F_4$ are processed by the operations $G_1$, $G_2$, $G_3$, and $G_4$, respectively to become four unified matrices of 512 by 80. The four unified matrices are stacked to form the constructed adaptive feature:

$$F = \psi\{G_1(F_{AD}), G_2(F_{WVD}), G_3(F_{CWD}), G_4(F_{WL})\},$$

where F is the constructed adaptive feature, $F_{AD}$ is the adaptive feature, $F_{WVD}$ is the WVD feature, $F_{CWD}$ is the CWD feature, $F_{WL}$ is the wavelet feature, $G_1$, $G_2$, $G_3$, $G_4$ are linear or non-linear operations, and $\psi$ is a data fusion operation. Then, the constructed adaptive feature is inputted into the CNN based signal classifier for recognizing the LPI radar signal waveform.

In the embodiments of the present disclosure, the adaptive feature extracted from the LPI radar signal is combined with the analytical feature extracted from the LPI radar signal to form the constructed adaptive feature. The constructed adaptive feature comprehensively represents the LPI radar signal. The constructed adaptive feature is inputted into the CNN based signal classifier for recognizing the LPI radar signal waveform. Thus, the performance of the LPI radar signal waveform recognition is improved.

The method consistent with the present disclosure is evaluated by inputting simulated signals into the LPI radar signal waveform recognition system. Then, the LPI radar signal waveform recognition rates are compared with the approaches using signal features including WVD, CWD, and wavelet.

As shown in FIG. 11, the input signals used in the evaluation are simulated LPI radar signals including polyphase coded radar signals such as Frank code, P1 code, P2 code, P3 code, P4 code, and noise radar signals. The radar sources are disturbed by additive white Gaussian noise (AWGN) in a propagation channel. Different signal-to-noise ratio (SNR) levels ranging from −20 dB to 5 dB are applied on the generated LPI waveforms. For each SNR level, 4,096 signal samples are collected for each type pf LPI signal with carrier frequency of 1 kHz and sampling frequency of 7 kHz to create the dataset for training and testing. For the polyphase coded signals, the number of code phases and the number of cycles per phase code are in ranges of (8,16) and (1,5). 96,000 signal samples are generated as the training dataset and 7,000 signal samples are generated as the testing dataset. The signal samples are evenly distributed on each SNR level and each type of waveform for both the training dataset and the testing dataset.

Figure 12:
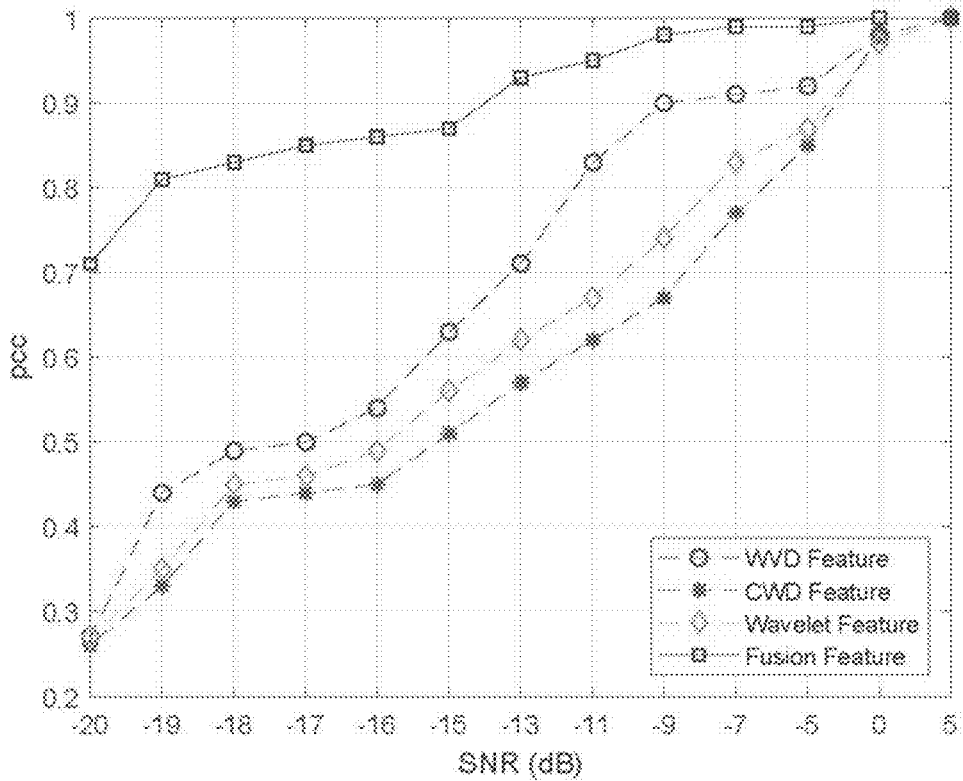
FIG. 12 depicts a schematic diagram comparing LPI waveform recognition performance under different SNR levels according to various disclosed embodiments of the present disclosure.
Figure 13A:
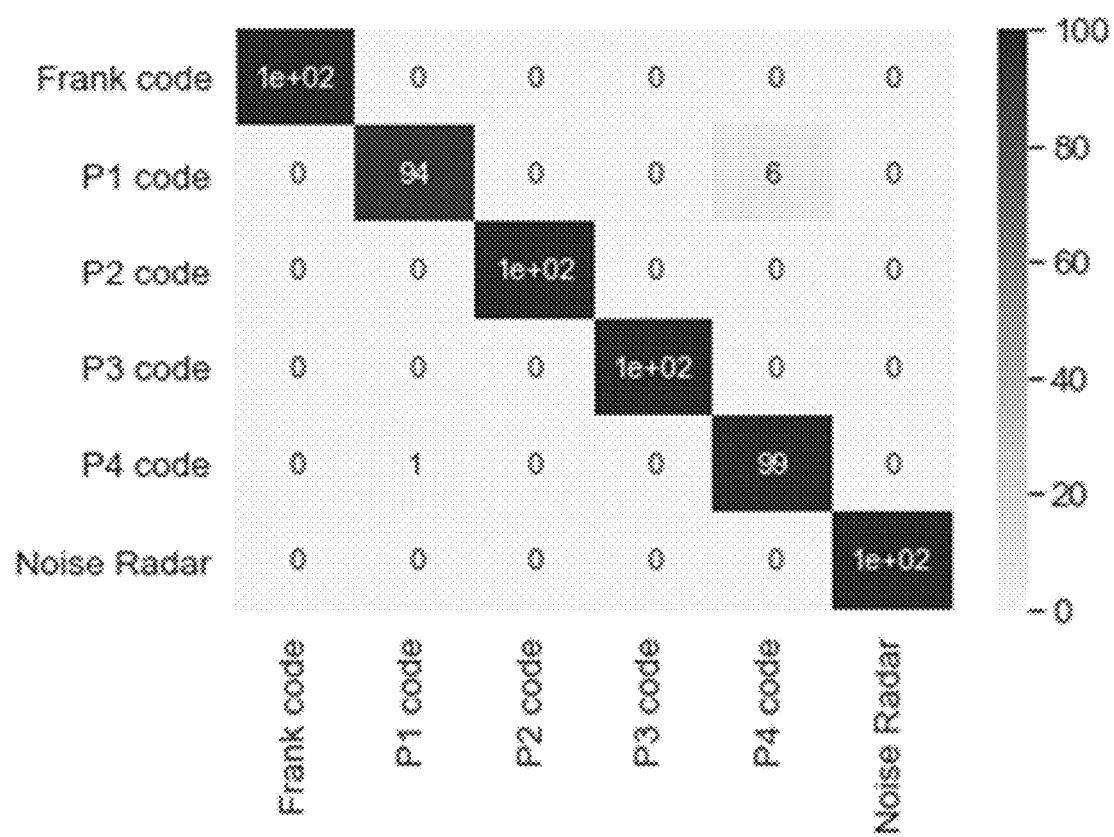
FIGS. 13A-13D depicts schematic diagrams illustrating confusion matrix for fusion feature under different SNR levels according to various disclosed embodiments of the present disclosure.
Figure 13B:
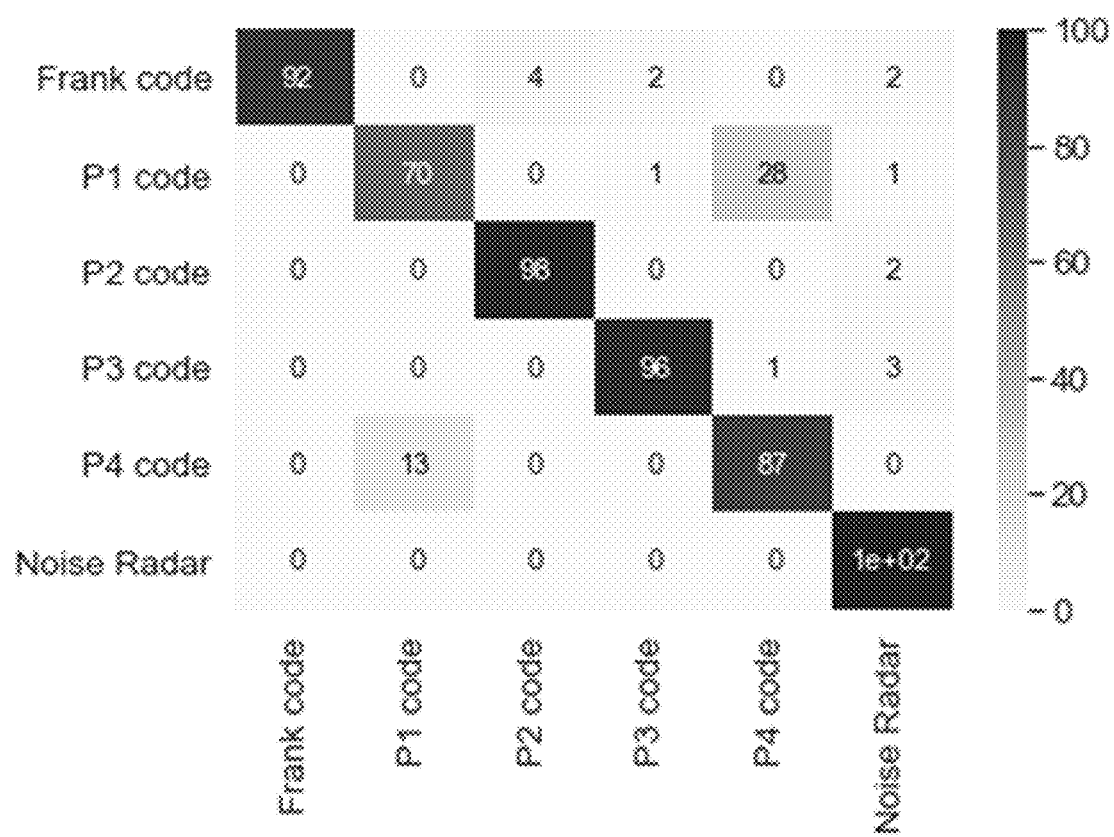
Figure 13C:
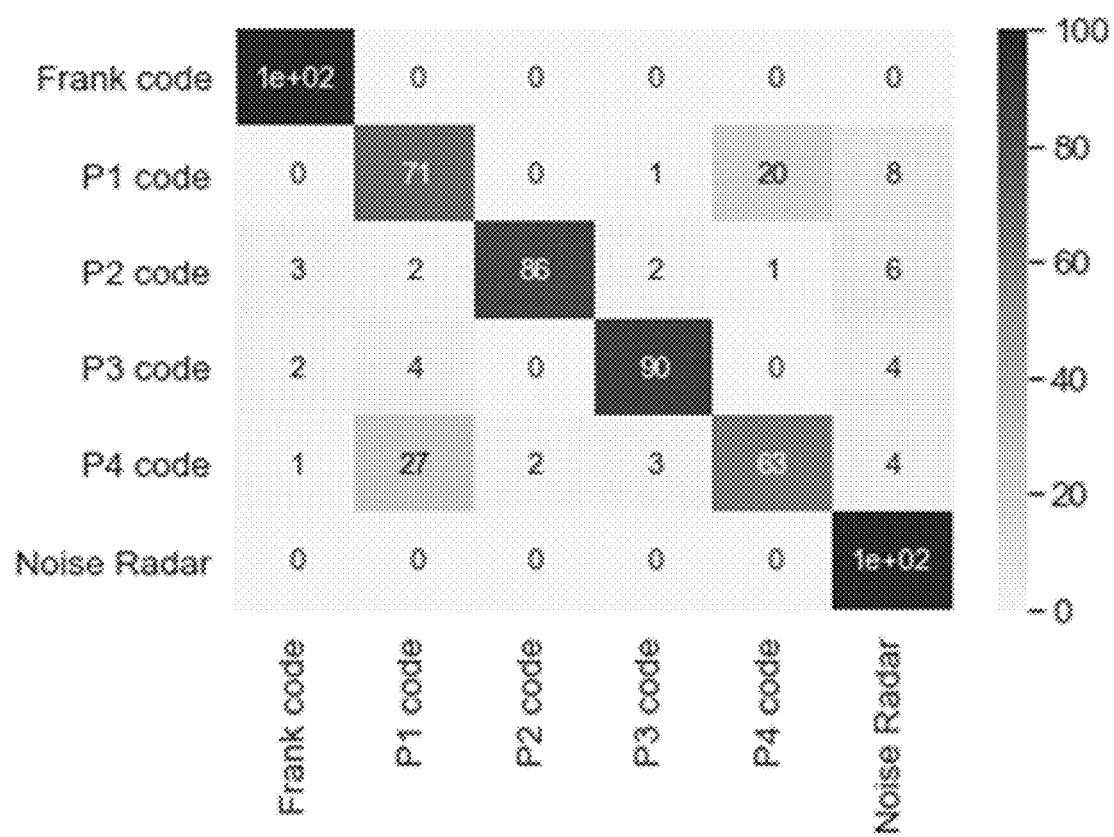
Figure 13D:
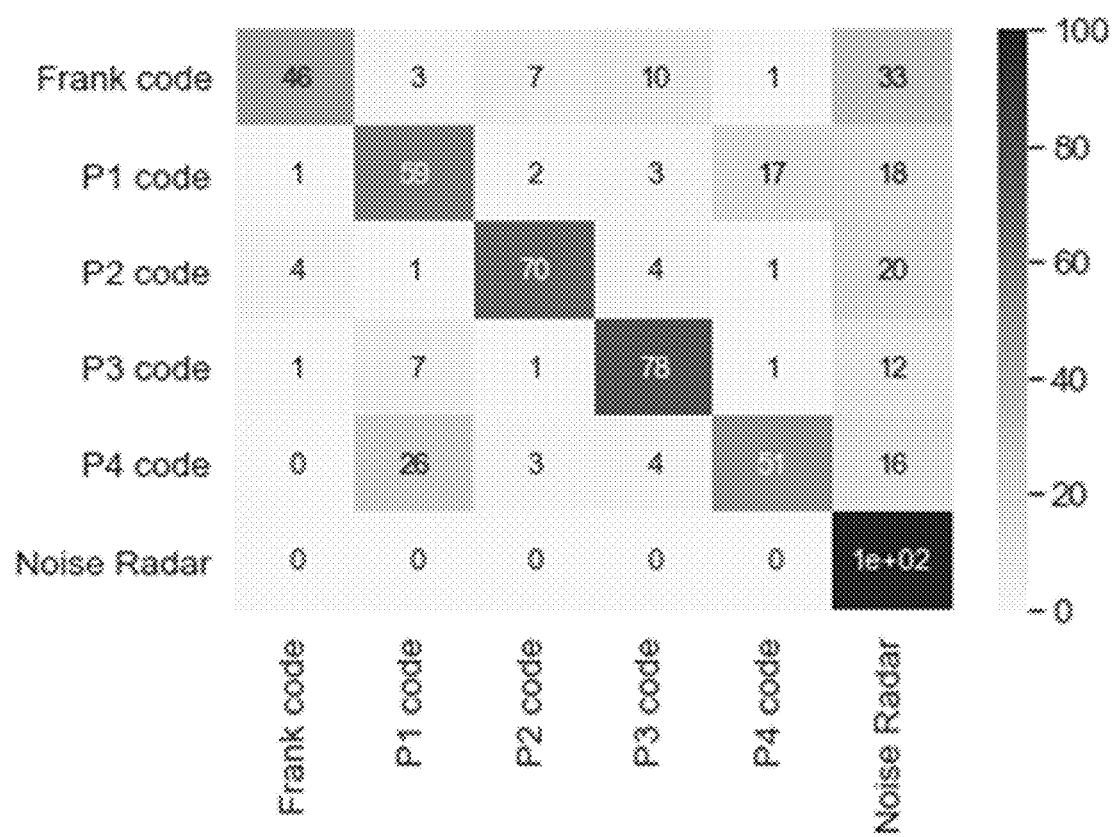

The generated datasets are used to train and test CNN models in the embodiments of the present disclosure. A grid search method is used for hyperparameter tuning when training the CNN models with different features. The optimal hyperparameters are selected for each model, and an average of 5 trials of model training and testing is used to compare the performance of the LPI radar signal waveform recognition. FIG. 12 shows the probability of correct classification (pcc) of the LPI radar signal waveform recognition models. Table 3 lists the pcc of each method with different SNR levels. As shown in FIG. 12 and Table 3, fusion feature of the disclosed method achieves higher pcc than other features over the entire SNR range. Thus, the disclosed method outperforms the wavelet feature, the CWD feature, and the WVD feature by up to 41% pcc improvement in recognizing the simulated LPI signal waveforms.

TABLE 3

| SNR (dB) | WVD feature [3] | CWD feature [5] | Wavelet feature [6] | Fusion feature |
|---|---|---|---|---|
| 5 | 1 | 1 | 1 | 1 |
| 0 | 0.98 | 0.98 | 0.97 | 1 |
| −5 | 0.92 | 0.85 | 0.87 | 0.99 |
| −7 | 0.91 | 0.77 | 0.83 | 0.99 |
| −9 | 0.90 | 0.67 | 0.74 | 0.98 |
| −11 | 0.83 | 0.62 | 0.67 | 0.95 |
| −13 | 0.71 | 0.57 | 0.62 | 0.93 |
| −15 | 0.63 | 0.51 | 0.56 | 0.87 |
| −16 | 0.54 | 0.45 | 0.49 | 0.86 |
| −17 | 0.50 | 0.44 | 0.46 | 0.85 |
| −18 | 0.49 | 0.43 | 0.45 | 0.83 |
| −19 | 0.44 | 0.33 | 0.35 | 0.81 |
| −20 | 0.27 | 0.26 | 0.27 | 0.71 |

FIG. 13 shows confusion matrices of the fusion feature under various SNR levels and classification details of different LPI radar signal waveforms. FIGS. 13A-3D correspond to the SNR levels of −10 dB, −15 dB, −18 dB, and −20 dB, respectively. Each type of the simulated LPI radar signals includes 100 signal samples. The diagonal entries represent the number of signal samples that are correctly classified, while other entries in the matrix show incorrectly classified LPI radar signal waveforms. Among all the types of the radar signal waveforms, the P1 and P4 code waveforms are more likely to be incorrectly classified.

As shown in FIG. 13, as the SNR decreases, the number of correct recognitions for different types of LPI radar signal waveforms decreases accordingly. The Frank code and noise radar signal waveform can be distinguished easily from other waveforms with the fusion feature. The P1 and P4 code waveforms are more difficult to classify correctly because the two types of the phase code signals are similar. The pcc of the fusion feature is greater than 70% even when the SNR is as low as −20 dB. Thus, the radar signal waveform recognition method provides desired performance in presence of a substantial noise.

Figure 14:
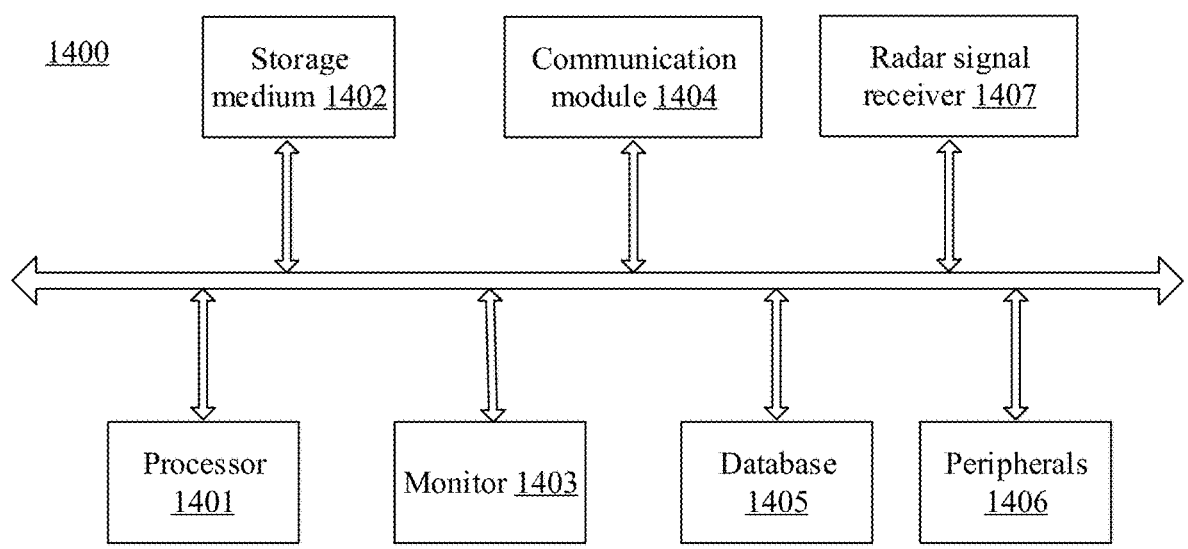
FIG. 14 depicts a block diagram illustrating an exemplary LPI radar signal waveform recognition system according to various disclosed embodiments of the present disclosure.

FIG. 14 depicts a block diagram illustrating an exemplary LPI radar signal waveform recognition system according to various disclosed embodiments of the present disclosure. As shown in FIG. 14, the system 1400 for the LPI radar signal waveform recognition may include a processor 1401, a storage medium 1402, a monitor 1403, a communication module 1404, a database 1405, a peripheral 1406, and a radar signal receiver 1407. Certain devices may be omitted and other devices may be included.

The processor 1401 is also called a radar signal processor. The processor 1401 may include any appropriate processor or processors. Further, the processor 1401 can include multiple cores for multi-thread or parallel processing. The storage medium 1402 may include memory modules, such as Read-only Memory (ROM), Random Access Memory (RAM), flash memory modules, erasable and rewritable memory, and mass storages, such as CD-ROM, U-disk, and hard disk, etc. The storage medium 1102 may store computer programs for implementing various processes, when executed by the processor 1101.

Further, the peripheral 1406 may include I/O devices such as a keyboard and a mouse. The communication module 1404 may include network devices for establishing connections through the communication network. The database 1405 may include one or more databases for storing certain data and for performing certain operations on the stored data, such as database searching.

The radar signal receiver 1407 receives a radar signal. The radar signal receiver 1407 often amplifies the radar signal. The radar signal receiver 1407 may also include an antenna. In some embodiments, the radar signal receiver may also include an embedded radar signal processor, which is not limited by the present disclosure.

In some embodiments, the processor 1401 is configured to execute the computer programs stored in the storage medium 1402 to: obtain an LPI radar signal s(t), s(t) varying with time t; extract an adaptive feature and a pre-defined analytical feature from the LPI radar signal s(t); combine the adaptive feature with the pre-defined analytical feature to generate a constructed adaptive feature; and apply a convolutional neural network (CNN) model to classify the constructed adaptive feature to recognize the LPI radar signal waveform.

In some embodiments, the adaptive feature includes one or more of an empirical mode decomposition (EMD) method and a variational mode decomposition (VMD) method.

In some embodiments, the processor 1401 is further configured to: identify all extrema of s(t); interpolate all local maxima to form an upper envelop u(t); interpolate all local minima to form a lower envelop l(t); calculate a mean envelop m(t), where m(t)=(u(t)+l(t))/2; extract the mean envelop m(t) from s(t) to obtain h(t), where h(t)=s(t)−m(t); determine whether h(t) is an intrinsic mode function (IMF); and in response to h(t) being an IMF and a number of obtained IMFs being less than a pre-configured number, iterate all above steps on a residue signal r(t), where r(t)=s(t)−h(t), otherwise iterate all above steps on h(t).

In some embodiments, the processor 1401 is further configured to solve:

$$\min_{u_k,\omega_k}\left\{\int \sum_k \left|\partial_t\left[\left(\delta(t)+\frac{j}{\pi t}\right)*u_k(t)\right]e^{-j\omega_k t}\right|^2 dt\right\}$$

$$\text{s.t.} \sum_k u_k = s(t),$$

where $u_k(t)$ is a decomposed IMF of s(t) with its center frequency $\omega_k$, $\delta(t)$ is a Dirac delta function, $1/\pi t$ is an impulse response of Hilbert transform, $$\left(\delta(t)+\frac{j}{\pi t}\right)*u_k(t)$$

is an analytic signal, a real part of the analytic signal is s(t), an imaginary part of the analytic signal is a Hilbert transform of s(t).

In some embodiments, the pre-defined analytical feature includes one or more of a Wigner-Ville Distribution (WVD) feature, a Choi-William Distribution (CWD) feature, and a wavelet feature.

In some embodiments, the WVD feature is calculated by:

$$W(t,\omega) = \frac{1}{2\pi}\int S\left(t+\frac{\tau}{2}\right)S^*\left(t-\frac{\tau}{2}\right)e^{-j\omega t}d\tau,$$

where S is the LPI radar signal, S* represents complex conjugate of the LPI radar signal, $\tau$ is a time lag, and $\omega$ is a frequency.

In some embodiments, the CWD feature is calculated by:

$$C_s(t,\omega,\phi) = \frac{1}{2\pi}\int\int\int e^{j(\xi\mu-\tau\omega-\xi t)}\phi(\xi,\tau)A(\mu,\tau)d\mu d\tau d\xi,$$

where $\phi(\xi,\tau)$ is a kernel function, $\phi(\xi,\tau)=e^{-\xi^2\tau^2/\sigma}$, $\sigma$ is a scaling factor, $\sigma>1$, $$A(\mu,\tau) = x\left(\mu+\frac{\tau}{2}\right)x^*\left(\mu-\frac{\tau}{2}\right),$$

x(μ) is a time signal and x*(μ) is its complex conjugate, μ and $\tau$ are axes in an ambiguity domain, $\tau$ is a time lag, and $\omega$ is a frequency.

In some embodiments, the wavelet feature is a Morse wavelet feature and is calculated by:

$$W(j,k) = \sum_j\sum_k s(k)\psi_{jk}(n),$$

and $$\psi_{jk}(n) = 2^{\frac{-j}{2}}\psi(2^{-j}n-k),$$

where S(k) is the LPI radar signal, W(j, k) are wavelet transform coefficients, $\psi_{jk}(n)$ is a mother wavelet, j is a scale parameter, and k is a shift parameter.

In some embodiments, the processor 1401 is further configured to calculate:

$$F = \psi\{G_1(F_{AD}), G_2(F_{WVD}), G_3(F_{CWD}), G_4(F_{WL})\}, \quad (5)$$

where F is the constructed adaptive feature, $F_{AD}$ is the adaptive feature, $F_{WVD}$ is the WVD feature, $F_{CWD}$ is the CWD feature, $F_{WL}$ is the wavelet feature, $G_1$, $G_2$, $G_3$, $G_4$ are linear or non-linear operations, and $\psi$ is a data fusion operation.

In some embodiments, $G_1$, $G_2$, $G_3$, $G_4$ operations include one or more of reshaping, squaring, down-sampling, and maxpooling.

In some embodiments, the adaptive feature, the WVD feature, the CWD feature, and the wavelet feature are 2-dimensional matrices. The data fusion operation includes stacking the 2-dimensional matrices.

In some embodiments, the CNN model includes three convolution layers.

In the embodiments of the present disclosure, the adaptive feature extracted from the LPI radar signal is combined with the predefined analytical feature extracted from the LPI radar signal to form the constructed adaptive feature. The constructed adaptive feature comprehensively represents the LPI radar signal. The constructed adaptive feature is inputted into the CNN based signal classifier for recognizing the LPI radar signal waveform. Thus, the performance of the LPI radar signal waveform recognition is improved.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for recognizing a low-probability-of-interception (LPI) radar signal waveform, comprising:
   obtaining, by a radar signal receiver, an LPI radar signal s(t), s(t) varying with time t;
   extracting, by a radar signal processor, an adaptive feature and a pre-defined analytical feature from the LPI radar signal s(t), wherein the pre-defined analytical feature includes a Wigner-Ville Distribution (WVD) feature, a Choi-William Distribution (CWD) feature, and a wavelet feature;
   combining, by the radar signal processor, the adaptive feature with the pre-defined analytical feature to generate a constructed adaptive feature according to:
   F=$\psi\{G_1(F_{AD}), G_2(F_{WVD}), G_3(F_{CWD}), G_4(F_{WL})\}$, wherein F is the constructed adaptive feature, $F_{AD}$ is the adaptive feature, $F_{WVD}$ is the WVD feature, $F_{CWD}$ is the CWD feature, $F_{WL}$ is the wavelet feature, $G_1$, $G_2$, $G_3$, $G_4$, are linear or non-linear operations, and $\psi$ is a data fusion operation; and
   applying, by the radar signal processor, a convolutional neural network (CNN) model to classify the constructed adaptive feature to recognize the LPI radar signal waveform.

2. The method according to claim 1, wherein:
   the adaptive feature includes one or more of an empirical mode decomposition (EMD) feature and a variational mode decomposition (VMD) feature.

3. The method according to claim 2, wherein extracting the EMD feature includes:
   identifying all extrema of s(t);
   interpolating all local maxima to form an upper envelop u(t);
   interpolating all local minima to form a lower envelop l(t);
   calculating a mean envelop m(t), wherein m(t)=(u(t)+l(t))/2;
   extracting the mean envelop m(t) from s(t) to obtain h(t), wherein h(t)=s(t)-m(t);
   determining whether h(t) is an intrinsic mode function (IMF); and
   in response to h(t) being an IMF and a number of obtained IMFs being less than a pre-configured number, iterating all above steps on a residue signal r(t), wherein r(t)=s(t)−h(t), otherwise iterating all above steps on h(t).

4. The method according to claim 2, wherein extracting the VMD feature includes:
   solving:

$$\min_{u_k, \omega_k} \left\{ \int \sum_k \left| \partial_t \left[ \left( \delta(t) + \frac{j}{\pi t} \right) * u_k(t) \right] e^{-j\omega_k t} \right|^2 dt \right\}$$

s.t.

$$\sum_k u_k = s(t),$$

wherein $u_k(t)$ is a decomposed IMF of s(t) with its center frequency $\omega_k$, $\delta(t)$ is a Dirac delta function, $1/\pi t$ is an impulse response of Hilbert transform, $$\left( \delta(t) + \frac{j}{\pi t} \right) * u_k(t)$$

is an analytic signal, a real part of the analytic signal is s(t), an imaginary part of the analytic signal is a Hilbert transform of s(t).

5. The method according to claim 1, wherein:
   the WVD feature is calculated by:

$$W(t, \omega) = \frac{1}{2\pi} \int S\left(t + \frac{\tau}{2}\right) S*\left(t - \frac{\tau}{2}\right) e^{-j\omega\tau} d\tau,$$

wherein S is the LPI radar signal, S* represents complex conjugate of the LPI radar signal, $\tau$ is a time lag, and $\omega$ is a frequency.

6. The method according to claim 1, wherein:
   the CWD feature is calculated by:

$$C_s(t, \omega, \phi) = \frac{1}{2\pi} \int \int \int e^{j(\xi\mu - \tau\omega - \xi t)} \phi(\xi, \tau) A(\mu, \tau) d\mu d\tau d\xi,$$

wherein $\phi(\xi, \tau)$ is a kernel function, $\phi(\xi, \tau) = e^{-\xi^2 \tau^2/\sigma}$, $\sigma$ is a scaling factor, $\sigma > 1$, $$A(\mu, \tau) = x\left(\mu + \frac{\tau}{2}\right) x*\left(\mu - \frac{\tau}{2}\right),$$

$x(\mu)$ is a time signal and $x*(\mu)$ is its complex conjugate, $\mu$ and $\tau$ are axes in an ambiguity domain, $\tau$ is a time lag, and $\omega$ is a frequency.

7. The method according to claim 1, wherein:
the wavelet feature is a Morse wavelet feature and is calculated by:

$$W(j, k) = \sum_j \sum_k s(k)\psi_{jk}(n),$$

and $$\psi_{jk}(n) = 2^{\frac{-j}{2}} \psi(2^{-j}n - k),$$

wherein S(k) is the LPI radar signal, W(j, k) are wavelet transform coefficients, $\psi_{jk}(n)$ is a mother wavelet, j is a scale parameter, and k is a shift parameter.

8. The method according to claim 1, wherein:
$G_1$, $G_2$, $G_3$, $G_4$ operations include one or more of reshaping, squaring, down-sampling, and maxpooling.

9. The method according to claim 1, wherein:
the adaptive feature, the WVD feature, the CWD feature, and the wavelet feature are 2-dimensional matrices; and
the data fusion operation includes stacking the 2-dimensional matrices.

10. The method according to claim 1, wherein:
the CNN model includes three convolution layers.

11. A system for recognizing a low-probability-of-interception (LPI) radar signal waveform, comprising:
a radar signal receiver for obtaining an LPI radar signal s(t), s(t) varying with time t;
a memory storing computer program instructions; and
a radar signal processor coupled to the memory and, when executing the computer program instructions, configured to perform:
extracting an adaptive feature and a pre-defined analytical feature from the LPI radar signal s(t), wherein the pre-defined analytical feature includes a Wigner-Ville Distribution (WVD) feature, a Choi-William Distribution (CWD) feature, and a wavelet feature;
combining the adaptive feature with the pre-defined analytical feature to generate a constructed adaptive feature according to:

$$F = \psi\{G_1(F_{AD}), G_2(F_{WVD}), G_3(F_{CWD}), G_4(F_{WL})\},$$

wherein F is the constructed adaptive feature, $F_{AD}$ is the adaptive feature, $F_{WVD}$ is the WVD feature, $F_{CWD}$ is the CWD feature, $F_{WL}$ is the wavelet feature, $G_1$, $G_2$, $G_3$, $G_4$ are linear or non-linear operations, and $\psi$ is a data fusion operation; and
applying a convolutional neural network (CNN) model to classify the constructed adaptive feature to recognize the LPI radar signal waveform.

12. The system according to claim 11, wherein:
the adaptive feature includes one or more of an empirical mode decomposition (EMD) feature and a variational mode decomposition (VMD) feature.

13. The system according to claim 12, wherein the radar signal processor is further configured to:
identify all extrema of s(t);
interpolate all local maxima to form an upper envelop u(t);
interpolate all local minima to form a lower envelop l(t);
calculate a mean envelop m(t), wherein m(t)=(u(t)+l(t))/2;
extract the mean envelop m(t) from s(t) to obtain h(t), wherein h(t)=s(t)−m(t);
determine whether h(t) is an intrinsic mode function (IMF); and
in response to h(t) being an IMF and a number of obtained IMFs being less than a pre-configured number, iterate all above steps on a residue signal r(t), wherein r(t)= s(t)−h(t), otherwise iterating all above steps on h(t).

14. The system according to claim 12, wherein the radar signal processor is further configured to:
solve:

$$\min_{u_k, \omega_k} \left\{ \int \sum_k \left| \partial_t \left[ \left( \delta(t) + \frac{j}{\pi t} \right) * u_k(t) \right] e^{-j\omega_k t} \right|^2 dt \right\}$$

s.t.

$$\sum_k u_k = s(t),$$

wherein $u_k(t)$ is a decomposed IMF of s(t) with its center frequency $\omega_k$, $\delta(t)$ is a Dirac delta function, $1/\pi t$ is an impulse response of Hilbert transform, $$\left( \delta(t) + \frac{j}{\pi t} \right) * u_k(t)$$

is an analytic signal, a real part of the analytic signal is s(t), an imaginary part of the analytic signal is a Hilbert transform of s(t).

15. The system according to claim 11, wherein:
the WVD feature is calculated by:

$$W(t, \omega) = \frac{1}{2\pi} \int S\left(t + \frac{\tau}{2}\right) S*\left(t - \frac{\tau}{2}\right) e^{-j\omega t} d\tau,$$

wherein S is the LPI radar signal, S* represents complex conjugate of the LPI radar signal, $\tau$ is a time lag, and $\omega$ is a frequency.

16. The system according to claim 11, wherein:
the CWD feature is calculated by:

$$C_s(t, \omega, \phi) = \frac{1}{2\pi} \int \int \int e^{j(\xi\mu - \tau\omega - \xi t)} \phi(\xi, \tau) A(\mu, \tau) d\mu d\tau d\xi,$$

wherein $\phi(\xi, \tau)$ is a kernel function, $\phi(\xi, \tau) = e^{-\xi^2 \tau^2 / \sigma}$, $\sigma$ is a scaling factor, $\sigma > 1$, $$A(\mu, \tau) = x\left(\mu + \frac{\tau}{2}\right) x*\left(\mu - \frac{\tau}{2}\right),$$

$x(\mu)$ is a time signal and $x*(\mu)$ is its complex conjugate, $\mu$ and $\tau$ are axes in an ambiguity domain, $\tau$ is a time lag, and $\omega$ is a frequency.

17. The system according to claim 11, wherein:
the wavelet feature is a Morse wavelet feature and is calculated by:

$$W(j, k) = \sum_j \sum_k s(k)\psi_{jk}(n),$$

and $$\psi_{jk}(n) = 2^{\frac{-j}{2}} \psi(2^{-j}n - k),$$

wherein S(k) is the LPI radar signal, W(j, k) are wavelet transform coefficients, $\psi_{jk}(n)$ is a mother wavelet, j is a scale parameter, and k is a shift parameter.

* * * * *